US009716405B2

(12) United States Patent
Gramm

(10) Patent No.: US 9,716,405 B2
(45) Date of Patent: Jul. 25, 2017

(54) PORTABLE POWER SYSTEM

(71) Applicant: Peppermint Energy, Inc., Sioux Falls, SD (US)

(72) Inventor: Brian Gramm, Sioux Falls, SD (US)

( * ) Notice: Subject to any disclaimer, the term of this patent is extended or adjusted under 35 U.S.C. 154(b) by 474 days.

(21) Appl. No.: 13/870,135

(22) Filed: Apr. 25, 2013

(65) Prior Publication Data

US 2013/0285452 A1    Oct. 31, 2013

Related U.S. Application Data

(60) Provisional application No. 61/640,134, filed on Apr. 30, 2012.

(51) Int. Cl.
*H02J 7/35* (2006.01)
*H02J 7/34* (2006.01)
*H02J 3/02* (2006.01)
*H02J 3/32* (2006.01)
*H02J 7/00* (2006.01)

(52) U.S. Cl.
CPC ............ *H02J 7/355* (2013.01); *H02J 3/02* (2013.01); *H02J 3/32* (2013.01); *H02J 7/0068* (2013.01); *H02J 7/34* (2013.01); *H02J 7/35* (2013.01); *Y10T 307/527* (2015.04)

(58) Field of Classification Search
CPC .... H02J 7/34; H02J 7/35; H02J 7/0068; H02J 3/02; H02J 7/355
USPC ...................................................... 307/48, 66
See application file for complete search history.

(56) References Cited

U.S. PATENT DOCUMENTS

| | | | |
|---|---|---|---|
| 4,537,838 A | 8/1985 | Jetter et al. | |
| 5,522,943 A | 6/1996 | Spencer et al. | |
| 5,855,692 A | 1/1999 | Kaji et al. | |
| 6,041,242 A | 3/2000 | Coulthard | |
| 6,173,835 B1 | 1/2001 | Swinger et al. | |
| 6,349,825 B1 | 2/2002 | Swinger et al. | |
| 6,476,311 B1 | 11/2002 | Lee et al. | |
| 6,737,573 B2 | 5/2004 | Yeh | |
| 7,948,208 B2 | 5/2011 | Partovi et al. | |
| 7,952,322 B2 | 5/2011 | Partovi et al. | |
| 8,008,887 B2 | 8/2011 | Lee | |
| 2004/0207366 A1 | 10/2004 | Sung | |
| 2005/0016579 A1 | 1/2005 | Elazari | |
| 2005/0140331 A1 | 6/2005 | McQuade | |
| 2007/0019453 A1* | 1/2007 | Pierce | H01M 2/10 363/107 |
| 2007/0072474 A1 | 3/2007 | Beasley et al. | |

(Continued)

FOREIGN PATENT DOCUMENTS

EP    2262093    12/2010

OTHER PUBLICATIONS

International Search Report and Written Opinion for PCT/US2013/038124 dated Aug. 15, 2013.

*Primary Examiner* — Jared Fureman
*Assistant Examiner* — James Evans
(74) *Attorney, Agent, or Firm* — Briggs and Morgan, P.A.; Gerald E. Helget

(57) ABSTRACT

An electronic circuit that accepts a variable DC voltage power source and converts it to a constant DC power source, the energy of which is either stored in a battery bank or sent out to DC loads or AC loads via a DC/AC conversion subsystem. The device capable of using solar, wind, geothermal, or hydroelectric energy sources.

11 Claims, 5 Drawing Sheets

(56) References Cited

U.S. PATENT DOCUMENTS

| | | |
|---|---|---|
| 2007/0222410 A1* | 9/2007 | Lee .................... H01L 31/0236 320/101 |
| 2009/0059630 A1 | 3/2009 | Williams |
| 2009/0096413 A1 | 4/2009 | Partovi et al. |
| 2009/0139562 A1 | 6/2009 | Thomas |
| 2010/0101624 A1* | 4/2010 | Fioretti ............ H01L 31/02008 136/244 |
| 2010/0133911 A1 | 6/2010 | Williams et al. |
| 2010/0320957 A1 | 12/2010 | Teufel et al. |
| 2011/0011759 A1 | 1/2011 | Luo |
| 2011/0140647 A1 | 6/2011 | Park |
| 2011/0221385 A1 | 9/2011 | Partovi et al. |
| 2012/0025750 A1 | 2/2012 | Margo |
| 2012/0047386 A1* | 2/2012 | Matsui ................ H01M 10/465 713/340 |
| 2012/0095612 A1 | 4/2012 | Rivers, Jr. et al. |

* cited by examiner

PORTABLE POWER SYSTEM

CROSS-REFERENCE TO RELATED APPLICATIONS

The present application claims priority to and incorporates by reference U.S. Provisional Patent Application No. 61/640,134 filed on Apr. 30, 2012.

BACKGROUND OF THE INVENTION

Field of the Invention

The present invention is in the technical field of energy. More particularly, the present invention is in the technical field of an electronics package suitable for portable power systems.

Background of the Invention

There has been a long standing need for portable energy devices, and in particular devices that utilize renewable energy sources. Such devices can utilize solar, wind, geothermal, or hydroelectric sources of energy. Devices can be used to power devices such as cell phones, computers, lights, as well as many other important devices.

Such devices are commonly used in industrialized societies to provide access when away from the electrical grid; however, given the stable and pervasive nature of the grid portable energy devices often viewed as a as a convenience rather than a necessity.

The is not the case in the less industrialized settings, such as in the third world, or in remote areas where the electrical grid is not as omnipresent. These devices provide critical access, and in some cases life saving access to power.

While prior art devices do exist they suffer from a number of drawbacks that limit the practical utility of such devices. Whereas, for example, some prior art devices convert solar energy to DC voltages such as the devices depicted in U.S. Pat. No. 6,844,739, U.S. Pat. No. 4,794,272 for Maximum Power Point Trackers, or disclosed in U.S. Pat. No. 4,969,078 or U.S. Pat. No. 7,379,284 for DC/DC converters, these devices are single in scope—they operate off a DC input and produce a DC output. Therefore, theses devices are suitable for charging a battery, which stores electricity for later use. Batteries are not particularly efficient at capturing available energy, and can take a long time to charge before they are capable of delivering enough energy to usefully power an electrical device.

A need exists for a portable energy device that can provide AC power to surrogate devices, as well as providing associated energy storage.

SUMMARY OF THE INVENTION

The present invention is a single, enclosed, electronic system that provides power (either AC or DC) from external energy sources (solar, wind, hydrothermal, etc.). The system has storage capability as well as providing power from either stored energy or directly from external sources.

DETAILED DESCRIPTION OF THE INVENTION

The power system described herein is an all-in-one unit that incorporates solar panels into a portable case having electronic circuitry enclosed which are capable of storing energy generated from solar panels (or other external sources) as well as sourcing energy in the form of an AC or DC voltage. The electronic circuitry is capable of regulating the variable power source inherent in solar panels to a constant DC voltage suitable for charging a battery, and/or running a DC to AC converter. The DC-to-AC converter is capable of transforming the DC voltage to an AC voltage (110 or 220 VAC, 50 or 60 Hz) to directly power surrogate devices connected to the power device.

Figure 1:
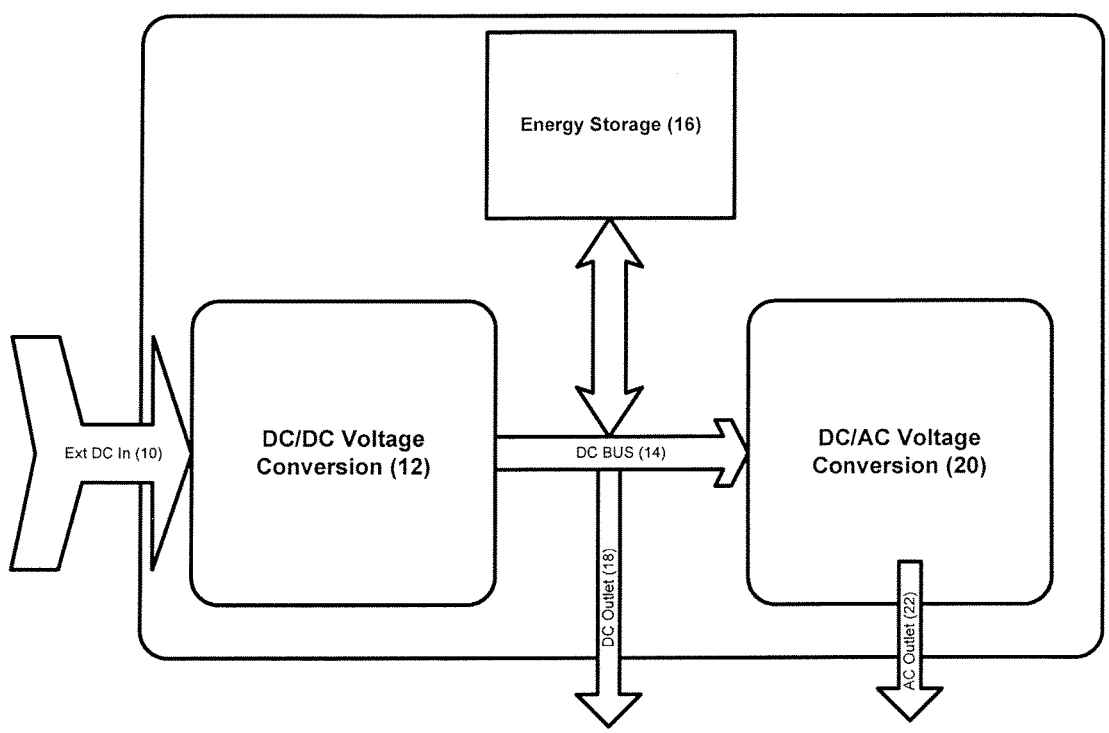
FIG. 1 is a diagrammatic drawing of the present invention.

Referring now to the invention in more detail, in FIG. 1 there is shown a diagram, outlining the operation of the electronic system. The electronic system is composed of a DC conversion subsystem (12 in FIG. 1), a power voltage bus (14 in FIG. 1) battery storage 16, a DC outlet 18, and inverter 20.

More specifically, the electronic system shown in FIG. 1 provides a method of voltage conversion (12 in FIG. 1) to take power from external sources (such as wind, solar, hydro, etc.—or plugging directly into the electric power grid) and convert it to the bus voltage (14 in FIG. 1, nominally 24 to 36 VDC). The bus voltage 14 is specifically set by the maximum charge voltage of the storage component 16. The power delivered to the bus is either stored in the batteries 16, shunted to the DC outlet 18, or shunted to the inverter 20. The inverter 20 provides conversion from DC to AC (either 110, 220 VAC at 50 or 60 Hz) and wires from the DC outlet to the front panel or wires from the AC outlet to the front panel allow for external connection of user loads (lights, television, computers, etc.).

Figure 2:
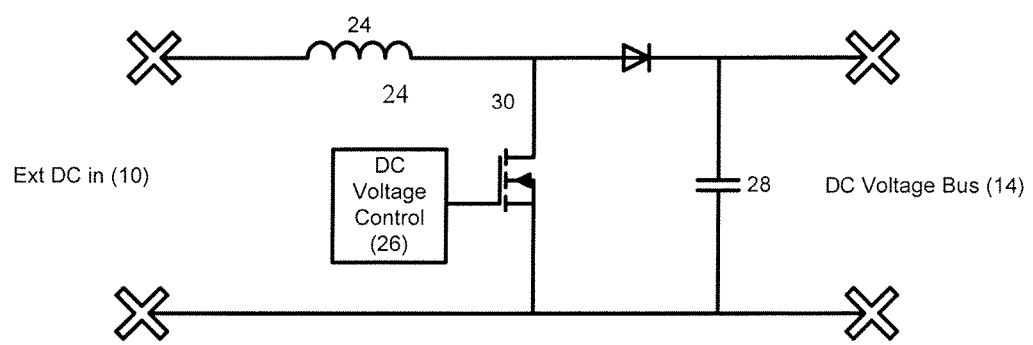
FIG. 2 is a circuit drawing of a voltage conversion subsystem of the present invention.

FIG. 2 shows a typical boost converter used for DC/DC conversion. It increases an external DC voltage 10 to a larger voltage heretofore referred to as the bus voltage 14. This converter uses a magnetic component 24 to store energy during a period of time when the semiconductor switching device 30 is in a conductive state, then discharges that energy through the load leveling capacitor 28 during the period of time when the semiconductor switching device 30 is non-conductive. By varying the ratio of conductive to non-conductive time, the DC voltage controller 26 varies the ratio of input 10 to output 14 voltage. The desired bus voltage 14 is set to the maximum charge voltage of the energy storage device 16.

Figure 3:
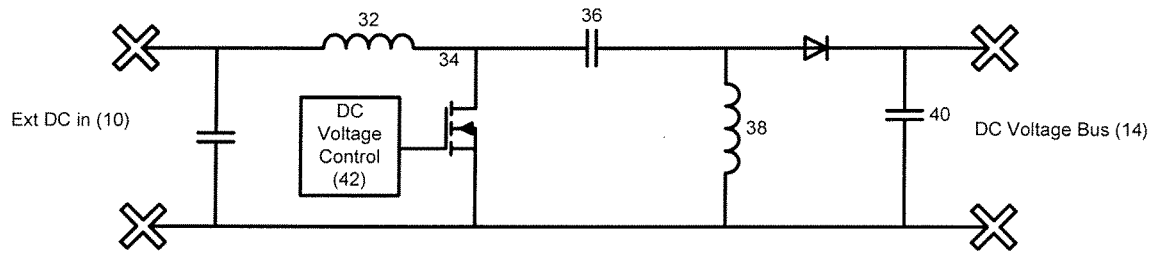
FIG. 3 is an alternative circuit drawing of a voltage conversion subsystem of the present invention.

FIG. 3 shows a variation of the boost converter known as a SEPIC converter used for DC/DC conversion. It increases an external DC voltage 10 to a larger voltage heretofore referred to as the bus voltage 14. This converter uses a magnetic component 32 to store energy during a period of time when the semiconductor switching device 34 is in a conductive state, then discharge that energy through the boost capacitor 36 during the period of time when the semiconductor switching device 34 is non-conductive. The secondary inductor 38 acts as a current sink to insure the average current to the load capacitor 40 and the DC bus 14 remains constant. By varying the ratio of conductive to non-conductive time, the DC voltage controller 42 varies the ratio of input 10 to output 14 voltage.

The desired bus voltage 14 is set to the maximum charge voltage of the energy storage device 16.

Figure 4:
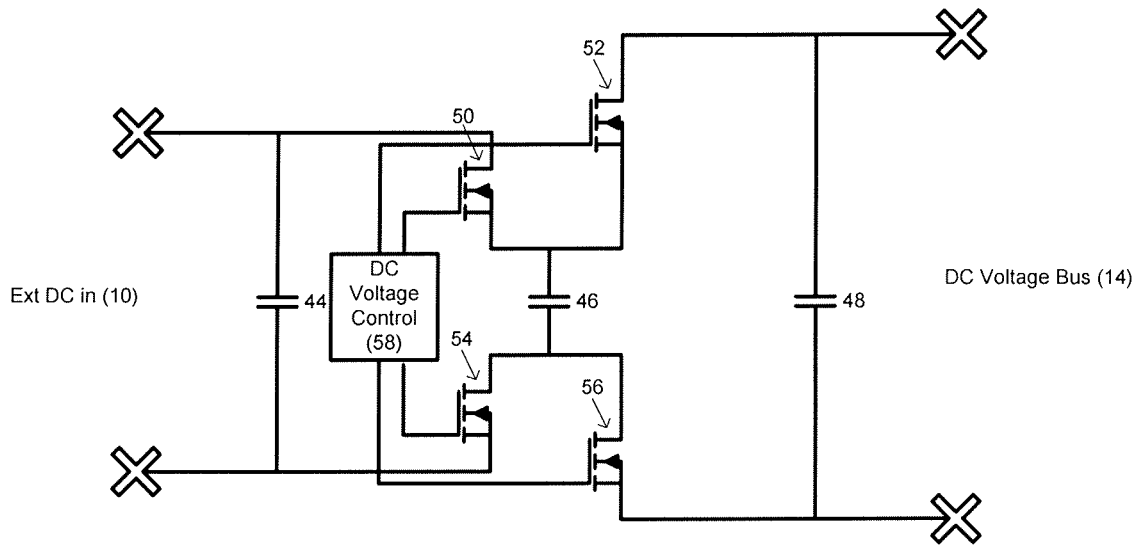
FIG. 4 is an alternative circuit drawing of a voltage conversion subsystem of the present invention.

FIG. 4 shows a DC converter implementation using the 'flying capacitor' type used for DC/DC conversion. During the time period when the semiconductor switching devices 50 and 54 are conductive, 52 and 56 are non conductive, the input capacitor 44 and boost capacitor 46 are in parallel and charging, while the load leveling capacitor 48 is discharged to the voltage bus 14 at desired level. When the semiconductor switching devices 50, 52, 54, and 56 change states, the input capacitor 44 and the boost capacitor 46 are in series, and charging the load leveling capacitor 48 to the bus voltage 14. By varying the ratio of conductive to non-conductive time, the bus voltage can be tuned to the voltage set by the maximum charge of the batteries.

Figure 5:
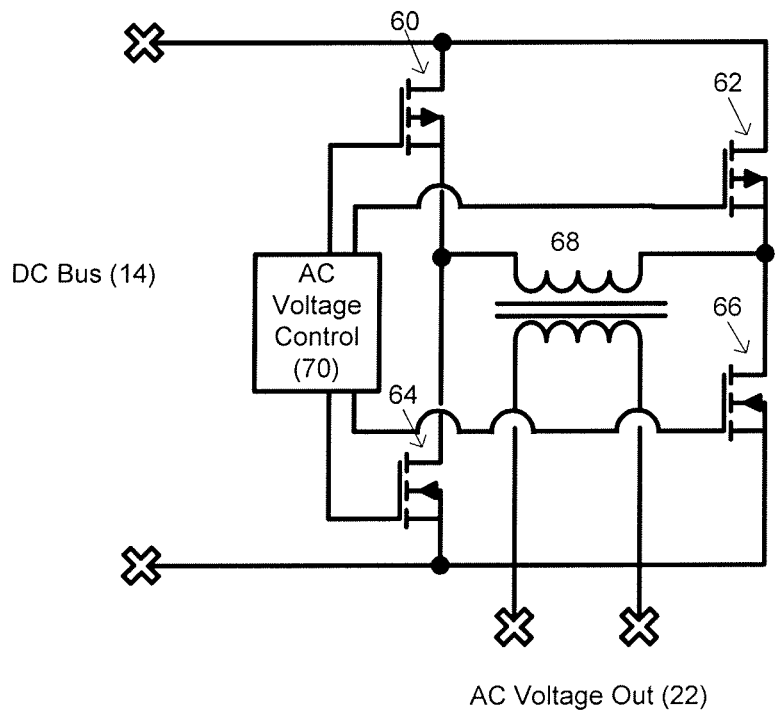
FIG. 5 is a circuit drawing of a DC-AC conversion subsystem of the present invention.

Moving on to the DC/AC conversion system (20 in FIG. 1), which converts the bus voltage 14 to an alternating voltage source 22 suitable for plug in devices depending on country. FIG. 5 shows the most typical style of DC/AC converter, known as the H-bridge. Semiconductor switching devices 60, 62, 64, 66 operate in opposition to each other. When 60 and 66 conduct, 62 and 64 do not, the switching devices change state, reversing the polarity of the transformer 68. This results in an alternating positive/negative voltage at the AC output 22. By varying the turns ratio of transformer 68, the magnitude of the AC voltage can be tuned to coincide with the RMS voltage of a utility (120 VAC, 210 VAC, etc.). The AC Voltage Control 58 determines the frequency of oscillation, to likewise coincide with the utility (50 or 60 Hz).

Figure 6:
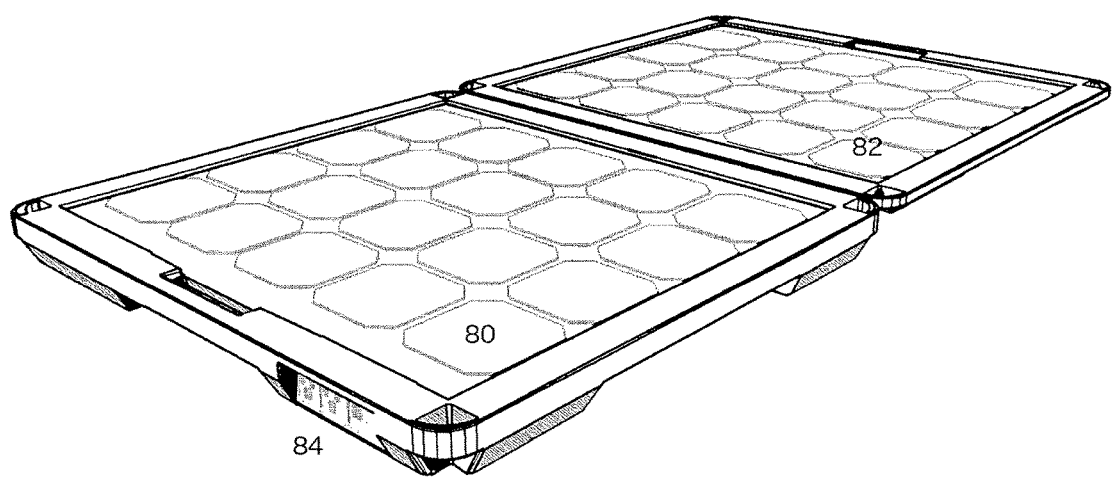
FIG. 6 is a perspective view of the entire device.

FIG. 6 shows the entire device. Solar panels 80 and 82 are connected to the base and cover. The device flips closed for portability. The AC and DC outlets are shown in the front of the unit 84. The solar panels generate power in the sun, which the electronics previously described either store electricity or use it for external power via the outlets 84. The electronics are stored in the base underneath solar panels 80.

Figure 7:
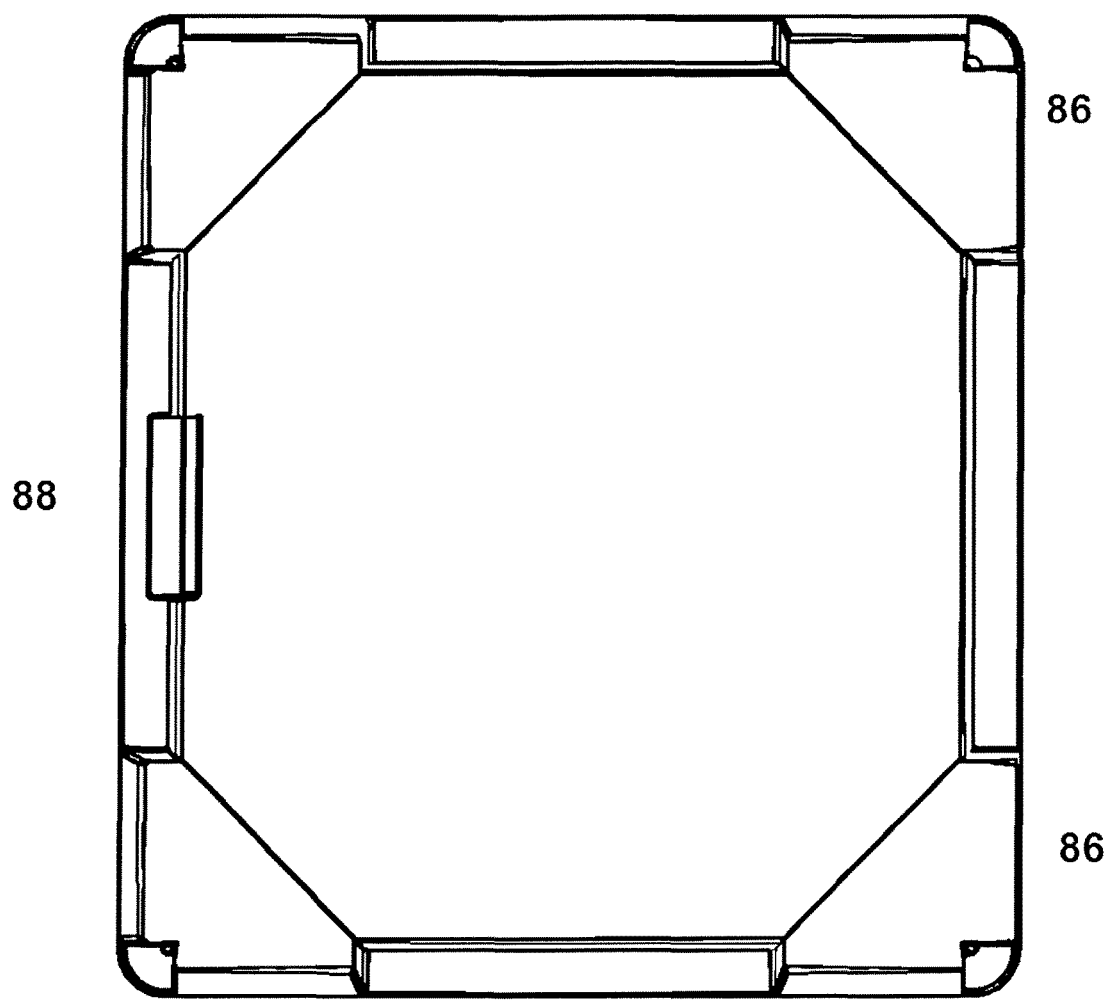
FIG. 7 is a view of the top of the device when closed.

FIG. 7 shows a top view of the unit closed. The top cover folds over the base via hinges 86, and the handle 88 allows the unit to be carried.

The advantages of the present invention include, without limitation, a single unit that converts a variable input DC voltage to a DC voltage suitable for storing power in a battery or delivering power as an AC or DC voltage. Also, it allows portable power generation without need for external fuels such as propane, diesel, or petroleum.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A portable electronic device, comprising:
   an input DC power source;
   a DC/DC voltage converter for converting the input power;
   a battery for storing the converted DC voltage;
   a DC/AC voltage converter; and
   an AC voltage outlet; and a plurality of solar panels for collecting solar radiation and converting it to become the source of the DC voltage; and
   a base for housing for foregoing components where the base has a first half and a second half hinged to fold the first and second halves into a closed and open position such that in the open position the solar panels are exposed and in the closed position the solar panels are not exposed in the manner of a suitcase,
   wherein the device converts solar radiation into AC power directly, without the aid of the battery, regardless of whether the battery is fully charged for storing electricity.

2. The device of claim 1 wherein the DC/DC voltage converter is a boost converter.

3. The device of claim 1 wherein the DC/DC voltage converter is a SEPIC converter.

4. The device of claim 1 wherein the DC/DC voltage converter is a flying capacitor converter.

5. The device of claim 1 wherein the DC/AC converter is an H-bridge converter.

6. The device of claim 1 comprising a power voltage bus for carrying power between the device components.

7. The device of claim 1 comprising a DC voltage outlet for delivering power from the battery.

8. The device of claim 1 comprising control circuitry that controls a semiconductor switching scheme to provide a desired output voltage.

9. The device of claim 1 wherein input DC power source comes from a device that generates power from wind.

10. The device of claim 1 wherein input DC power source comes from a device that generates power from a geothermal source.

11. The device of claim 1 wherein input DC power source comes from a device that generates power from a hydroelectric source.

* * * * *